United States Patent [19]
Perkins

[11] 3,780,750
[45] Dec. 25, 1973

[54] FACILITATING RENEWAL OF OIL FLOW IN A PIPELINE
[75] Inventor: Thomas K. Perkins, Dallas, Tex.
[73] Assignee: Atlantic Richfield Company, New York, N.Y.
[22] Filed: Dec. 4, 1972
[21] Appl. No.: 312,050

[52] U.S. Cl. .......................... 137/13, 137/236, 137/1
[51] Int. Cl. ............................................... F17d 1/16
[58] Field of Search .................... 137/1, 13, 15, 236

[56] References Cited
UNITED STATES PATENTS
3,702,744  11/1972  Brown ........................... 137/236 X Primary Examiner—Alan Cohan
Attorney—M. David Folzenlogen et al.

[57] ABSTRACT

Renewal of oil flow through a section of pipeline in which quiescent oil has gelled is facilitated by causing a segment of the gelled oil to yield in either an upstream or downstream direction. A portion of the yielded segment is removed from the pipeline. Liquid oil of relatively low resistance to flow as compared to the yielded segment is passed through the section of the pipeline previously occupied by the yielded segment. Thereafter, the removed oil is returned into the pipeline. The yielded segment may be removed at an elevation below a significant portion of the segment of the gelled oil to be yielded. If the elevation difference is in a downstream direction, removal of the yielded segment may be used to decrease the hydrostatic pressure resisting renewal of oil flow. The hydrostatic head pressure caused by this elevation difference may be used to yield the segment of gelled oil and to cause a portion of the yielded segment to flow from the pipeline. As a less desirable alternative, a displacing fluid may be used to cause the segment of gelled oil to yield and flow from the pipeline.

7 Claims, 1 Drawing Figure

PATENTED DEC 25 1973  3,780,750
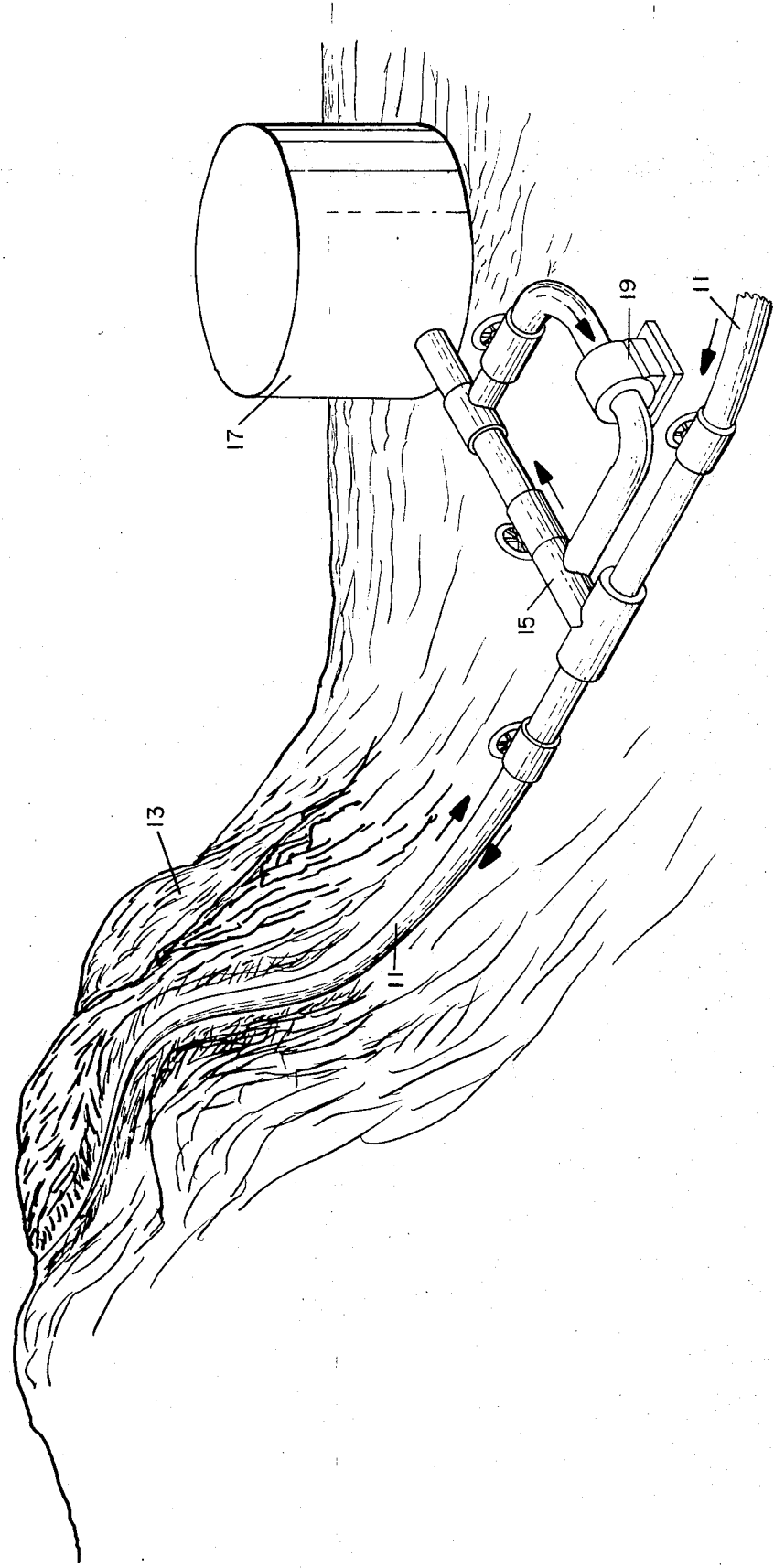

FACILITATING RENEWAL OF OIL FLOW IN A PIPELINE

BACKGROUND OF THE INVENTION

This invention relates to a method for facilitating renewal of flow of oil through a pipeline containing gelled oil.

In cold regions where for long periods the prevailing ambient temperature is cold enough to cool static oil to a temperature approaching or below its pour point, cessation of oil flow through an oil gathering line or feeder line, or trunk line will cause stationary oil in the pipeline to cool and gel. This gives rise to the problem of restarting oil flow when the pipeline is shutdown for a period long enough for the oil to gel. This problem is encountered in the pipelining of crude oils in cold climates like the arctic regions and in the pipelining of certain fuels or synthetic high pour point oils. When oil flow through a gelled section of a pipeline is to be renewed, the static head pressure, the length of the gelled subsection, and the yield strength of the gelled oil may be such that it would require an undesirably high pressure to restore the flow of liquid oil through the pipeline. The renewal pressure should not exceed the design pressure of the pipeline, the pumping stations, and related equipment. The desired renewal pressure for a system varies with the size of the line and the design conditions as well as various operating limitations, safety valves and equipment installed with the line.

Pipelines are laid up and down slopes, valleys, river beds, and mountains. This results in elevation differences between sections of the pipeline. For example, in one proposed oil pipeline for Alaska near the Yukon River a hydrostatic head or gravity pressure in excess of 600 psi could occur. When oil flow through the pipeline is to be renewed, this hydrostatic pressure can severely limit the amount of additional pressure that can be applied to the line. In addition, if the static head pressure arises from a downstream direction, the hydrostatic pressure resists renewal of oil flow.

When oil flow through a pipeline is to be renewed, oil is pumped into the pipeline until the yield pressure is reached. Under certain conditions, especially where downstream sections of the pipeline are experiencing high hydrostatic pressures, initial pump injection rates will be low and it may take long periods of time to restore the desired oil flow rate. Yet, there is a minimum flow rate compatible with the installed pumps that must be maintained. Otherwise, the pump temperature starts to rise rapidly burning out seals and bearings and the like unless heat is removed or the pump is stopped by temperature safety devices. The minimum desirable flow rate can be quite large and on the order of tens of thousands of barrels of oil per day.

Even if other startup systems are used, there is a maximum allowed time for restoring and bringing oil flow back up to the desired level. Down time is costly and creates collateral problems. The startup system should be reliable and the time required to restore flow should be reasonable and reliably predictable.

SUMMARY OF THE INVENTION

Renewal of flow of liquid oil through a pipeline in which stationary oil has formed a stationary gel is facilitated in a way which reduces the startup pressure. The method of facilitating renewal of oil flow permits startup at a flow rate high enough to avoid overheating of pumps installed to pump and maintain the rate of oil flow through the pipeline. The method is useful for reducing the startup time of a pipeline in a reliable and predictable manner. The method is especially suited for a pipeline which is laid on and follows the contour of uphill and downhill terrain where hydrostatic head or gravity pressure limits the amount of pressure increase that can be applied to startup a pipeline. The method for facilitating renewal of oil flow through a gelled oil section of a pipeline is especially advantageous for restoring flow through a section where renewal of flow is resisted by hydrostatic head pressure caused by downstream elevation differences.

The normal startup pressure through a section containing gelled oil depends on the yield strength of the gelled oil, the internal pipe diameter, the length of the gelled oil section, and the hydrostatic head pressure.

The length of the gelled oil section is shortened and the normal startup pressure is reduced by causing a segment of the gelled oil to yield and by removing a substantial portion of the yielded segment from the pipeline at a point between the inlet and the outlet of the pipeline. Thereafter liquid oil having a yield strength and flow resistance substantially less than the yielded segment is flowed through the section of the pipeline from whence the yielded segment came. The removed yielded gelled oil can then be returned to the pipeline into liquid oil flowing therein.

Reducing the normal startup pressure permits restoration of oil flow at a startup flow rate compatible with the pipeline pumps thereby lessening the chances of overheating the pumps.

Preferably, a significant portion of the yielded segment of gelled oil comes from an elevation higher than the point of removal and the hydrostatic head pressure created by the elevation difference caused the segment to yield and flow from the pipeline. When the removal point is upstream from the yielded segment, the yielded segment flows upstream and reduces the hydrostatic head pressure resisting oil flow in the downstream direction.

BRIEF DESCRIPTION OF THE DRAWING

The drawing is a fragmented view of a section of a pipeline illustrating a preferred way of facilitating renewal of oil flow through a gelled section of the line.

DETAILED DESCRIPTION OF THE INVENTION

Oil flowing in a pipeline at normal temperatures behaves as a Newtonian fluid. When a pipeline which passes through a region where the ambient temperature is below the pour point of the oil is shutin, the static oil cools increasing in yield strength and gels into a thixotropic material with a relatively high resistance to flow. This quiescent gelled oil hampers or blocks renewal of oil flow from an upstream point to a downstream point.

When oil flow is to be renewed, the total startup pressure required to commence movement of the gelled stationary oil is dependent upon the yield properties of the gelled oil, the length of the gelled oil sections, the hydrostatic head pressures resisting restoration of oil flow, and, to a point, on the rate of application of the pressure. The maximum startup pressure differential that can be applied is the maximum design pressure of the pumping stations or the safe operating pressure of the pipeline and related equipment, whichever is less, minus the hydrostatic pressure. If the permitted pressure differential is relatively small or the startup pressure or the hydrostatic pressure is unduly high, the startup pump injection rates could be low enough to overheat the pumps and/or low enough to require an excessive period of time to restore the desired flow rate and at the same time cause overheating of the pumps. As a result, it is important that the total startup pressure not only be below a pressure which will damage the pipeline and related equipment but also below a pressure which will undesirably reduce the pump injection rate and unduly lengthen the time to restore the desired flow rate.

In this invention, liquid oil flow from an upstream point or a toward-the-source point through a gelled section or sections of the pipeline to a downstream point or an away-from-the-source point is facilitated in a reliably predictable manner which alleviates the aforementioned difficulties. In one embodiment, the need for side equipment is minimized, and in another embodiment, downstream hydrostatic pressures resisting renewal of oil flow are reduced.

As shown in the drawing, pipeline 11 is laid on uphill and downhill terrain 13 and generally follows the contour of the terrain. The pipeline may be laid on the ground or buried, or only partially or intermittently buried with some sections laid on the surface or elevated on gravel berms or suspended above the ground on pile bents. Prior to this invention, the section pipeline illustrated was blocked by gelled stationary oil. Flow of oil from an upstream point (not shown) through the illustrated section to a downstream point (not shown) is scheduled for renewal. At an appropriate point intermediate or between the upstream point and the downstream point is removal point 15 formed by a side drain line which acts as a specially-located removal point permitting removal or drainage of a substantial segment of the gelled oil as hereinafter set forth. The drain line leads to an appropriate storage facility 17 which has a capacity large enough to a preselected amount of partially-gelled oil as hereinafter set forth. Connected to the drain line or storage facility 17 is pump or injection means 19 adapted to return the partially-gelled oil from the storage facility into pipeline 11. The injection means or pump 19 may be relatively small since the rate of return of the partially-gelled oil to the pipeline has nothing to do with the method for facilitating renewal of oil flow in the pipeline.

Preferably as illustrated, removal point 15 created by the drain line is at a net elevation substantially lower than at least a portion of the pipeline to be drained. Under these conditions, the elevation difference causes the oil column to create a hydrostatic head pressure on the removal point. In one preferred embodiment of the method of this invention, this hdyrostatic head pressure is at least as great as the yield strength of the segment of gelled oil to be drained at the removal point and is sufficient to cause a portion of this segment of gelled oil to drain from the line. In addition, in order to derive greater advantage from the method of this invention, the elevation difference will, as shown, be in a downstream direction and the gelled oil drained in a backward or upstream direction thereby reducing the hydrostatic pressure resisting renewal of oil flow through pipeline 11.

In operation, at least one segment of the gelled oil is caused to yield toward removal point 15. The segment extends from removal point 15 to an upstream or a downstream point. A segment of gelled oil between two points will exhibit a certain yield strength. The pressure differential across the length of a segment of gelled oil can be increased until the gelled oil segment begins to visibly move. The pressure differential at which a gelled oil segment visibly starts to flow after a static period at that temperature is therein called the yield pressure. The force pushing the gel is approximately the product of the internal area of the pipeline multiplied by the pressure differential ($\Delta P$), and at the point of yield, this force is equal to the shear resistance of the gelled oil segment. The shear resistance of the gelled oil segment is approximately equal to the product of the apparent yield strength or shear stress ($\tau$) multiplied by the internal surface area of the pipeline for the length (L) of the segment chosen, that is $\pi DL$ where D is the internal diameter of the pipeline. As used herein, the apparent shear stress incorporates allowance for visible movement of the gel and a reasonable rate of application of the startup pressure. The following Equation 1 is an expression of the equality of force and shear resistance at the yield pressure:

$$\tau \pi DL = \Delta P \, \pi D^2/4$$

(1)

Equation 1 can be simplified into the following Equation 2:

$$\Delta P = (\tau) \, 4L/D$$

(2)

Equation 2 is useful for roughly estimating the yield pressure between two points and for plotting scaling or comparing experimental data. For most pipelines, the ratio of $4L$ to $D$ is large for the section of the pipeline between pumping stations. The distance between pumping stations depends on a number of factors including size of the pipeline, the flow rate, the design operating pressure, topographical and rheological factors, and economics. The conditions affecting the yield strength and the yield pressure of a segment of gelled oil will be hereinafter discussed.

The gelled oil is thixotropic and shear rate degradable. Once the yield pressure is exceeded and the gelled oil begins to move, shear degradation takes place where there is a velocity gradient between layers of the gel. This shear degradation significantly reduces the yield pressure of the degraded gelled segment by about 40 to 60 per cent. The rate of shear degradation depends on the rheological properties of the oil and its gel characteristics, and on the rate of movement of the segment. It has been found that the rate of shear degradation initially undergoes a rapid degradation. Thereafter, the rate of shear degradation tapers off to a relatively gradual rate. This reduction in yield pressure of the yielded segment is very useful for removing a portion of the yielded segment from the pipeline at removal point 15.

A portion of the yielded segment is removed from the pipeline at removal point 15 through the drain line to storage facility 17. Further shear degradation will usually occur as the yielded segment passes through the drain line. Normally additional degradation will not be required. The degraded gelled oil will not rebuild its gel strength for a period long enough for the method of this invention to be carried out. Nevertheless, if it is desirable to further degrade the yielded segment or to maintain its flow properties, the storage facility may be heated or the oil may be circulated and degraded by injection means 19.

Yielding and removal of a portion of the gelled oil segment facilitates renewal of oil flow through the pipeline in two ways. First, as previously mentioned, yielding of the gelled oil segment shear degrades the yielded gel thereby significantly decreasing its yield strength. Thus, the part of the yielded segment, if any, left in the pipeline has a significantly lower flow resistance than the previously quiescent gel. However, as compared to liquid oil, the yielded segment still has a relatively high flow resistance. Secondly, removal of a portion or substantially all of the yielded gelled oil segment reduces the yield pressure of the remaining unyielded gelled oil in the pipeline. As previously shown, the yield pressure is proportional to length. Removal of the yielded segment shortens the length and thereby reduces the yield pressure. Removal of the yielded segment also lessens the total flow resistance because the yielded segment still exhibits a relatively high flow resistance as compared to liquid oil. Removal of a portion or all of the yielded segment has a still further advantage as will hereinafter be shown where such removal reduces the hydrostatic head pressure resisting renewal of oil flow.

The segment of gelled oil can be caused to yield in several ways. A fluid may be injected into pipeline 11 by way of any means suitable for introducing a fluid into a pipeline to cause the segment to yield and to flow from the pipeline by way of removal point 15. The maximum injection pressure and rate of fluid injection will, of course, be restricted and controlled so that the injection pressure will remain below a pressure which will damage the pipeline and related equipment.

More preferably, when the pipeline is being designed, the location of removal point 15 is selected in a manner such that a portion of the segment of gelled oil to be yielded is at an elevation higher than the removal point and the segment may be caused to yield and to be removed in an upstream direction. In this situation, the elevation difference creates a hydrostatic head pressure resisting renewal of oil flow through the gelled segment. The gelled segment is caused to yield toward the removal point and to be removed from this downstream direction. As a result, removal of the yielded segment not only removes relatively high flow resistant partially-degraded gelled oil, but also decreases the hydrostatic head pressure resisting renewal of oil flow.

In the most preferred embodiment of this invention, the selected site for the removal point is not only upstream from and at an elevation lower than a portion of the segment of gelled oil to be yielded, but is also at a point where the net hydrostatic head pressure caused by the elevation difference is at least as great as the yield strength and yield pressure of this segment. This hydrostatic head pressure is used to cause the segment of gelled oil to yield in an upstream direction toward the removal point and to cause at least a portion of the yielded segment to flow from the pipeline through removal point 15 to storage facility 17. As previously mentioned, when the segment yields, shear degradation occurs and the resistance to flow is quickly and significantly reduced by about 40 to 60 per cent of the yield pressure. As a result, no special injection equipment is needed to cause the segment to yield and to cause all or a portion of the yielded segment to flow from the pipeline. The yielded segment will continue to flow as long as the net decreasing hydrostatic pressure is sufficient to overcome the decreasing flow resistance of the yielded segment.

Yielding and removal of at least a portion of the segment of gelled oil, therefore, facilitates renewal of liquid oil flow from a point upstream of the removal point through the section of the pipeline from whence the yielded segment came to a point downstream of the removal point at a pressure below the startup pressure which would normally have been required to displace oil through this section. Accordingly, liquid oil flow commenced pressure and oil is passed from the upstream point through the section of the pipeline from whence the yielded segment came. The liquid oil has a flow resistance much lower than the gelled oil. Flow of liquid oil quickly restores the flow capacity of this section of the pipeline. Thereafter the partially degraded yielded gel removed from the pipeline is returned by injection means 19 to the pipeline at any point where liquid oil is flowing therein. The rate of return of this previously removed oil is practically immaterial to the process and the rate of return can be quite small.

The following conditions affect the yield strength and yield pressure of a segment of gelled oil. Crude oils are usually a complex mixture of oils, waxes, asphalts, bitumens, and resins with a wide range of melting points, cloud points, or pour points. Some of the effects observed when investigating the factors influencing the gel strength and yield pressure of an oil are complex and not fully understood. Concepts or explanations have been proposed which explain at least in part what has been observed and it has been fully demonstrated that the yield pressure of an oil developed during period of quiescence varies widely with the composition of the oil, the temperature, the thermal history of the oil, the rate of cooling, the previous shear history of the oil, aging of the oil, and the compressiblity of the system.

The effects of asphalt, waxes, and the like components on the pour point of oil is well known. In addition, the gel strength of an oil is sensitive to the presence or absence of light ends. Weathering, flashing, or removal of light ends leads to a significant increase in gel strength. Moreover, flashing of live crude oil from a producing well to atmospheric pressure in one step leads to a higher yield strength than multistep flashing. Of course, the presence of large percentages of water would affect yield, but water is usually separated from the oil before the oil is passed through the pipeline. The mixing of even a small quantity of high yield strength oil tends to lead to a mixture having the yield strength like the high yield strength oil.

In general, decreasing the gel temperature and increasing the rate of cooling increase the yield strength and in turn cause a higher yield pressure.

As to shear history, it has been found that subjecting the oil to high shear conditions tends to increase the yield strength of the gelled oil after it is subsequently cooled to a low temperature. The observed effect of shear depends in part on the temperature of the oil during the time of shear application. The temperature in turn is affected by the composition of the oil.

Aging and thermal history are in some respects alike. As used herein, however, aging relates to time at a given temperature. In general, for a period of time the gel strength of a gel increases. Results indicate that the gel strength begins to stabilize in about 8 to 10 hours of residence time.

The thermal history of an oil primarily relates to cycles in temperature with the peaks in high and low temperatures encountered being important. Generally, if an oil is returned to a high temperature and held at that temperature for a period of time, the effects of prior thermal history are for practical purposes erased. The temperature to which the oil must be raised depends on the composition of the oil. If the temperature of the oil is cycled in a manner such that the oil never reaches the restoration temperature, cycling tends to cause an increase in yield pressure when the oil is subsequently cooled and gelled. The effects of cycling on yeild pressure depend in part on the temperature to which the oil is raised during a cycle. The effects of a peak temperature during a cycle depend on the composition of the oil. In general, for normal crude oil, it has been found that cycling of the crude oil at a temperature below 40° F increases the ultimate yield pressure of the oil when the oil is cooled and gelled. The mechanism by which the yield increase occurs can be explained in the following manner. The asphalt micelles and paraffin crystals form simultaneously when the oil is cooled. If the oil is cooled to a temperature above its gel point or pour point, the cooled oil has no structure and consequently very little gel strength. Upon reheating of the cooled oil, the paraffin tends to go back into solution while the asphalt micelles are not significantly affected unless the temperature is raised significantly. When the temperature is again lowered, the paraffin crystals reform but this time they form within and around the asphalt micelles. This results in a paraffin-asphalt gel structure of considerable strength at low temperatures; consequently, the ultimate yield pressure of a gelled oil which has been subjected to this type of cycling is quite high.

Equations have been developed and published which for purpose of this invention adequately predict yield behavior of gelled, thixotropic oils in pipelines. In general, the shear strength of a certain oil at a certain temperature is approximately a point function of shear rate and shear strain. The relationships involved have been verified experimentally by first returning the oil to its original condition. This is best accomplished by reconstitution of the oil, if desired, and by reheating the oil to some temperature level, for example, the reservoir temperature or some other preceding high process temperature. This temperature level is held for a period of time to overcome the effects of prior yield affecting factors. Thereafter, subsequent factors like rate of cooling, shearing, mixing, temperature cycling, and the like, which measurably influence yield strength, can be controlled and varied or simulated to develop the desired correlations.

EXAMPLE

A 48-inch OD crude oil pipeline for Prudhoe Bay, Alaska, having a wall thickness of 0.462 inch and an internal design pressure of 832 psi has a 70-mile section between two pumping stations starting at a riverbed at an elevation of about 300 feet which is a low upstream point for this section of the pipeline. The pipeline is made up of alternating 5-mile increments of buried and surface line and is laid up and down terrain with the 70-mile downstream point being at an elevation of 2,000 feet. This section of the pipeline is filled with oil and the hydrostatic head pressure at the riverbed is 650 psi. The pipeline has been shut-in long enough for the oil to gel, but not long enough for the temperature of the buried increments to fall below 32° F. The gel in the surface increments is −20° F. In this example, the Prudhoe Bay crude oil has a yield strength of 0.1 dyne per square centimeter at 32° F. At −20° F, this crude oil exhibited a yield strength between 15 and 900 dynes per square centimeter depending on beneficiated and nonbeneficiated history or treatment. For sake of illustration, it is first assumed that the yield strength at −20° F is 25 dynes per square centimeter and that it is desired that the pump startup pressure not drop below 500,000 barrels of oil per day (BOPD). Under the illustrated conditions with a maximum pressure not to exceed 832 psi, the pump rate falls below 500,000 BOPD in about 4.5 minutes and it takes about 56 minutes for the startup flow rate to rise again to the 500,000 BOPD level. However, if the hydrostatic head pressure is used to yield the oil toward the riverbed and 13,000 barrels of oil are drained at the riverbed in accordance with the method of this invention, an estimated startup flow rate of 500,000 BOPD may be maintained. If it is assumed that the yield strength at −20° F is 100 and 200 dynes per square centimeter, used of the hydrostatic head pressure to yield the oil toward the riverbed and drainage of 160,000 barrels and 240,000 barrels, respectively, will allow maintenance of the 500,000 BOPD startup flow rate. This illustrates the advantages of the method of this invention for facilitating renewal of oil flow through a gelled section of a pipeline.

The foregoing description illustrates preferred embodiments of a method for facilitating renewal of oil flow in a pipeline. Reasonable variations and modifications are practical within the scope of this disclosure without departing from the spirit and scope of the claims of this invention.

The embodiments of the invention in which an exclusive property or privilege is claimed are defined as follows:

1. A method for facilitating renewal of flow of oil from an upstream point to a downstream point through a pipeline which generally follows the contour of uphill and downhill terrain and in which oil has formed a stationary gel, which method comprises causing at least one segment of the gelled oil to yield toward a removal point between said upstream and downstream points, removing a portion of the yielded segment from the pipeline at said removal point, passing liquid oil from said upstream point through the section of said pipeline from whence said yielded segment came, and thereafter returning the removed oil to said pipeline into liquid oil flowing therein.

2. The method according to claim 1 wherein at least a portion of at least one segment of gelled oil that is caused to be yielded is at an elevation higher than said removal point.

3. The method according to claim 1 wherein at least one segment of the gelled oil is caused to yield in an upstream direction toward said removal point and at least a portion of said segment is at an elevation higher than said removal point.

4. The method according to claim 1 wherein one segment of the gelled oil is caused to yield in an upstream direction toward the removal point and a portion of said one segment is removed from said pipeline at said removal point, another segment of the gelled oil is caused to yield in a downstream direction toward said removal point and a portion of said another segment is removed from said pipeline at said removal point, and liquid oil is passed from said upstream point through the section of said pipeline from whence both of said yielded segments came.

5. The method according to claim 1 wherein at least a portion of at least one segment of the gelled oil to be yielded is at an elevation higher than the removal point and the hydrostatic head pressure caused by said elevation is at least as great as the yield pressure of said segment, and said hydrostatic head pressure is used to cause said segment to yield and to cause at least a portion of said yielded segment to flow from said pipeline at said removal point.

6. The method according to claim 5 wherein said segment is caused to yield in an upstream direction.

7. The method according to claim 1 wherein at least a portion of one segment of the gelled oil to be yielded is at an elevation higher than the removal point and the hydrostatic head pressure caused by said elevation is at least as great as the yield pressure of said one segment, and said hydrostatic head pressure is used to cause said one segment to yield in an upstream direction toward said removal point and to cause a portion of said yielded one segment to flow from said pipeline at said removal point, at least a portion of another segment of the gelled oil to be yielded is at an elevation higher than said removal point and the hydrostatic head pressure caused by said elevation is at least as great as the yield pressure of said another segment, and said hydrostatic head pressure is used to cause said another segment to yield in a downstream direction toward said removal point and to cause a portion of said yielded another segment to flow from said pipeline at said removal point, and liquid oil is passed from the upstream point through the section of said pipeline from whence both of said yielded segments came.

* * * * *